US008469204B1

(12) United States Patent
Bradshaw

(10) Patent No.: US 8,469,204 B1
(45) Date of Patent: Jun. 25, 2013

(54) REMOTE CONTROL ORGANIZING SYSTEM

(76) Inventor: Clifford Bradshaw, Washington, DC (US)

( * ) Notice: Subject to any disclaimer, the term of this patent is extended or adjusted under 35 U.S.C. 154(b) by 587 days.

(21) Appl. No.: 11/704,928

(22) Filed: Feb. 12, 2007

(51) Int. Cl.
*A47F 7/00* (2006.01)

(52) U.S. Cl.
USPC ........................................ 211/26.1

(58) Field of Classification Search
USPC ............ 211/13.1, 10, 26.1; 248/441.1, 448, 248/451, 460, 205.2, 918, 473, 469, 472; 40/745, 657, 607.03, 726, 700, 729, 739, 40/761, 764, 763, 762, 753, 358, 605, 730, 40/735, 759, 780, 781, 790, 792, 796, 799; D6/300; 206/320, 371; 403/292; D19/95, D19/99, 52; D20/15, 18
See application file for complete search history.

(56) References Cited

U.S. PATENT DOCUMENTS

| 342,675 | A | * | 5/1886 | Braddock | 47/41.01 |
| 1,006,270 | A | * | 10/1911 | Planert | 24/67.7 |
| 2,003,746 | A | * | 6/1935 | Headington | 248/452 |
| 2,434,860 | A | * | 1/1948 | Oxley | 248/460 |
| 4,044,980 | A | * | 8/1977 | Cummins | 248/456 |
| 4,199,883 | A | * | 4/1980 | Cross | 40/735 |
| D278,109 | S | * | 3/1985 | Leeds | D6/419 |
| 4,709,412 | A | * | 11/1987 | Seymour et al. | 398/114 |
| 4,712,693 | A | * | 12/1987 | Striplin | 211/164 |
| 4,771,976 | A | * | 9/1988 | Su | 248/448 |
| 4,838,505 | A | * | 6/1989 | Lowe | 248/176.1 |
| 4,852,746 | A | * | 8/1989 | Wells et al. | 211/26.1 |
| 4,856,658 | A | | 8/1989 | Novak | |
| 4,879,823 | A | * | 11/1989 | Collins | 40/124.01 |
| 4,911,389 | A | * | 3/1990 | Self | 248/146 |
| 4,991,817 | A | * | 2/1991 | VonKleist et al. | 248/676 |
| 5,024,011 | A | * | 6/1991 | Collins | 40/124.01 |
| 5,122,937 | A | | 6/1992 | Stoudemire | |
| 5,127,615 | A | * | 7/1992 | Jones | 248/172 |
| 5,154,391 | A | * | 10/1992 | Hegarty | 248/454 |
| D332,360 | S | | 1/1993 | Golds | |
| 5,244,173 | A | * | 9/1993 | Kulyk | 248/176.1 |
| 5,269,484 | A | * | 12/1993 | Jones | 248/172 |
| 5,316,249 | A | * | 5/1994 | Anderson | 248/146 |
| 5,341,941 | A | * | 8/1994 | Marlor | 211/26.1 |
| D351,527 | S | * | 10/1994 | Baca et al. | D6/467 |
| 5,370,238 | A | | 12/1994 | Czajkowski et al. | |
| 5,370,241 | A | * | 12/1994 | Silvers | 211/26.1 |
| 5,529,271 | A | * | 6/1996 | Dunchock | 248/205.2 |
| 5,615,768 | A | * | 4/1997 | Schermerhorn | 206/305 |
| 5,872,702 | A | * | 2/1999 | Kopel | 361/810 |
| 5,944,292 | A | * | 8/1999 | Roman | 248/200 |
| 5,954,208 | A | * | 9/1999 | Schultz | 211/13.1 |
| D426,985 | S | * | 6/2000 | Casalino | D6/466 |
| 6,491,194 | B2 | * | 12/2002 | Marvin | 224/483 |
| 2005/0098510 | A1 | * | 5/2005 | Lom et al. | 211/13.1 |
| 2005/0155942 | A1 | * | 7/2005 | Viola | 211/26.1 |
| 2006/0091030 | A1 | * | 5/2006 | Tawanapoor | 206/320 |

* cited by examiner

*Primary Examiner* — Darnell M Jayne
*Assistant Examiner* — Stanton L Krycinski

(57) ABSTRACT

A remote control organizing system includes a base that has a front edge. A lip is attached to and is coextensive with the front edge. The lip is angled back over a top side of the front edge. A panel has a bottom edge and a coupler releasably attaches the bottom edge to an upper edge of the lip. A plurality of the remote controls each has a back side. A plurality of securing members releasably attaches the back sides to a front side of the panel. At least one spacer is provided. The at least one spacer is attached to the panel and positioned between a raised portion of one of the back sides and the panel to approximately position a longitudinal axis of the associated ones of the remote controls into a parallel alignment with a plane of the panel.

16 Claims, 5 Drawing Sheets

REMOTE CONTROL ORGANIZING SYSTEM

BACKGROUND OF THE INVENTION

1. Field of the Invention

The present invention relates to remote control storage devices and more particularly pertains to a new remote control storage device for organizing and storing a plurality of remote controls so that the remote controls are easily viewed and retrieved as needed.

2. Description of the Prior Art

The use of remote control storage devices is known in the prior art. While these devices fulfill their respective, particular objectives and requirements, the need remains for a system that takes into account the inherent shape differences of remote controls. In particular, remote controls often have varying thicknesses along their length to place more of the weight of the remote control in the hand of the user. However, this shape prevents the remote control from lying flush on a flat surface. For this reason, a system is needed that takes into account the varying shapes of remote controls.

SUMMARY OF THE INVENTION

The present invention meets the needs presented above by generally comprising a base that has a top side, a bottom side, a front edge, a rear edge, a first lateral edge and a second lateral edge. A lip is attached to and is coextensive with the front edge. The lip is angled back over the top side. A panel has a top edge, a bottom edge, a first side edge and a second side edge. A coupler releasably attaches the bottom edge to an upper edge of the lip. The panel lies in a same plane as the lip and is angled back over the top side of the base. A plurality of the remote controls each has a back side. A plurality of securing members each includes a first mating member and a second mating member releasably attached to each other. Each of the first mating members is attached to a front side of the panel and each of the back sides of the remote controls has at least one of the second mating members attached thereto. At least one spacer is provided. The spacer is approximately planer and has a height less than ½ a height of the panel and a width less than ⅓ a width of the panel. The at least one spacer is attached to the panel and positioned between a raised portion of one of the back sides and the panel to approximately position a longitudinal axis of the associated ones of the remote controls into a parallel alignment with a plane of the panel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
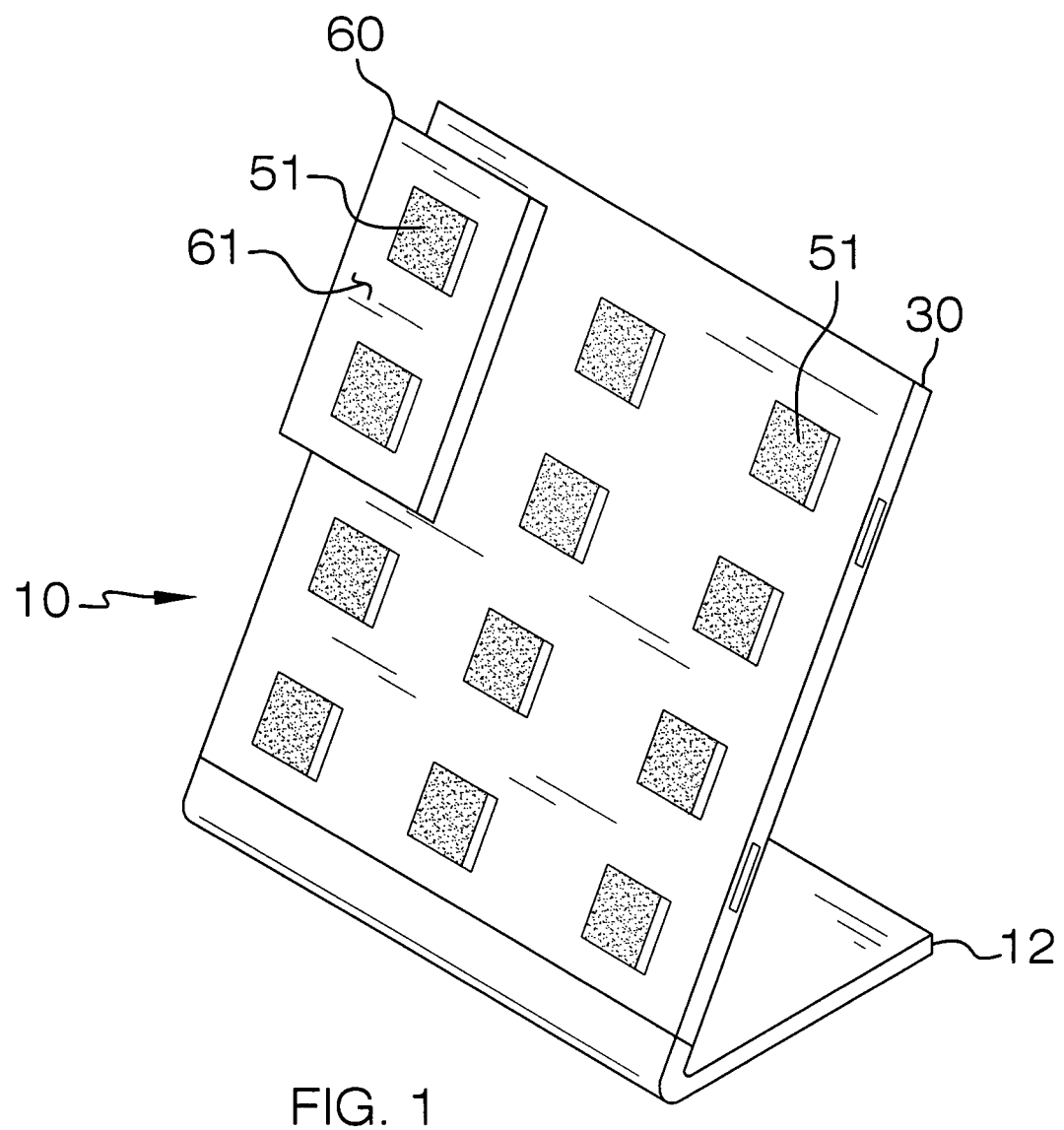
FIG. 1 is a perspective view of a remote control organizing system according to the present invention.
Figure 2:
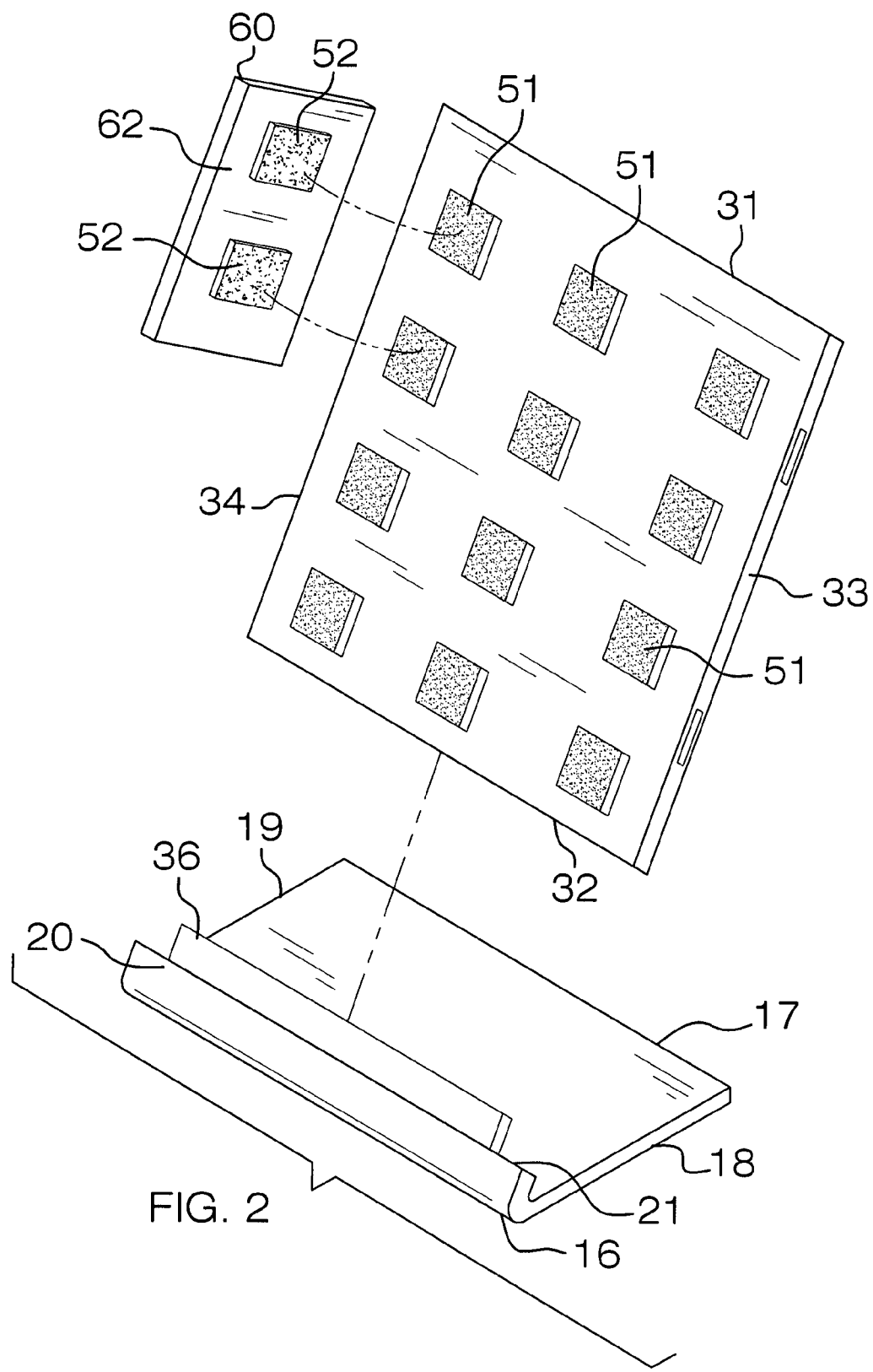
FIG. 2 is a perspective view of the present invention.
Figure 3:
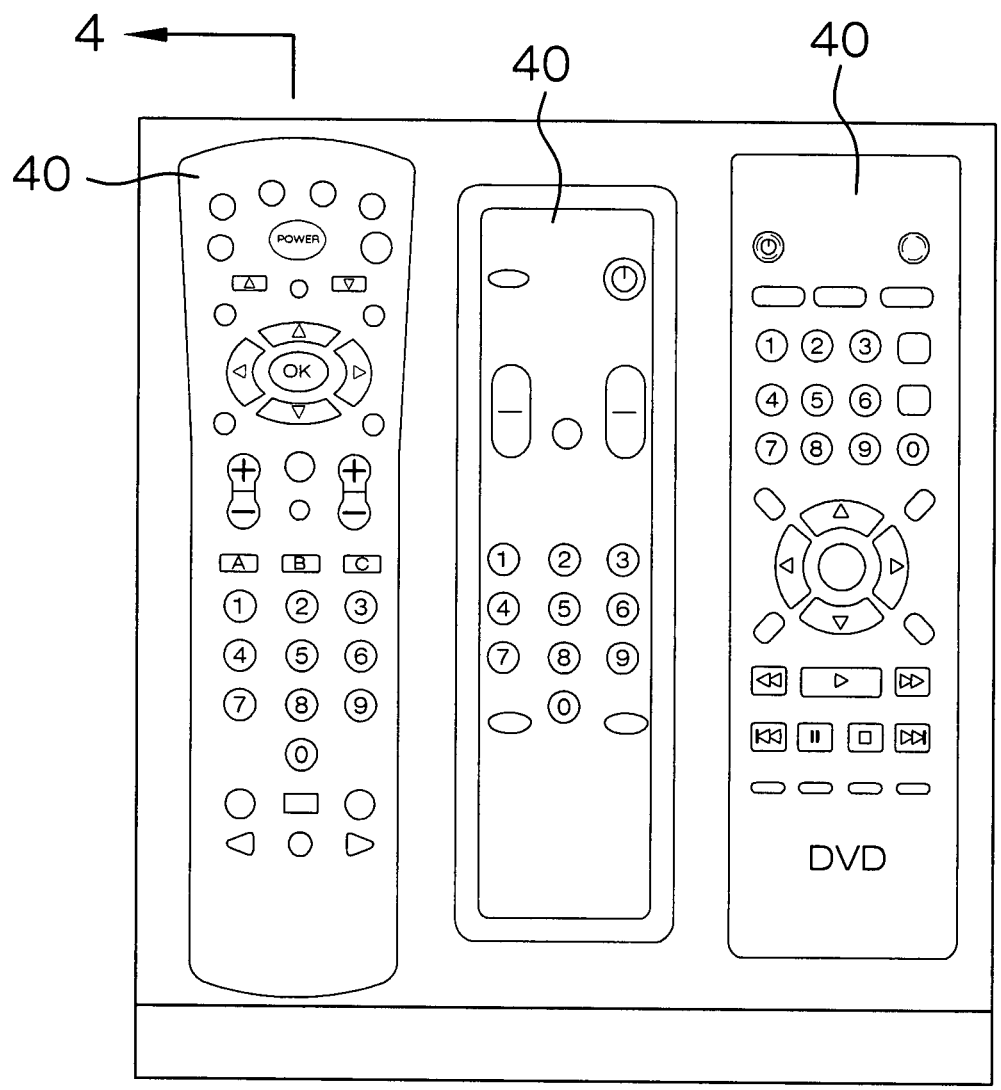
FIG. 3 is a front in-use view of the present invention.
Figure 4:
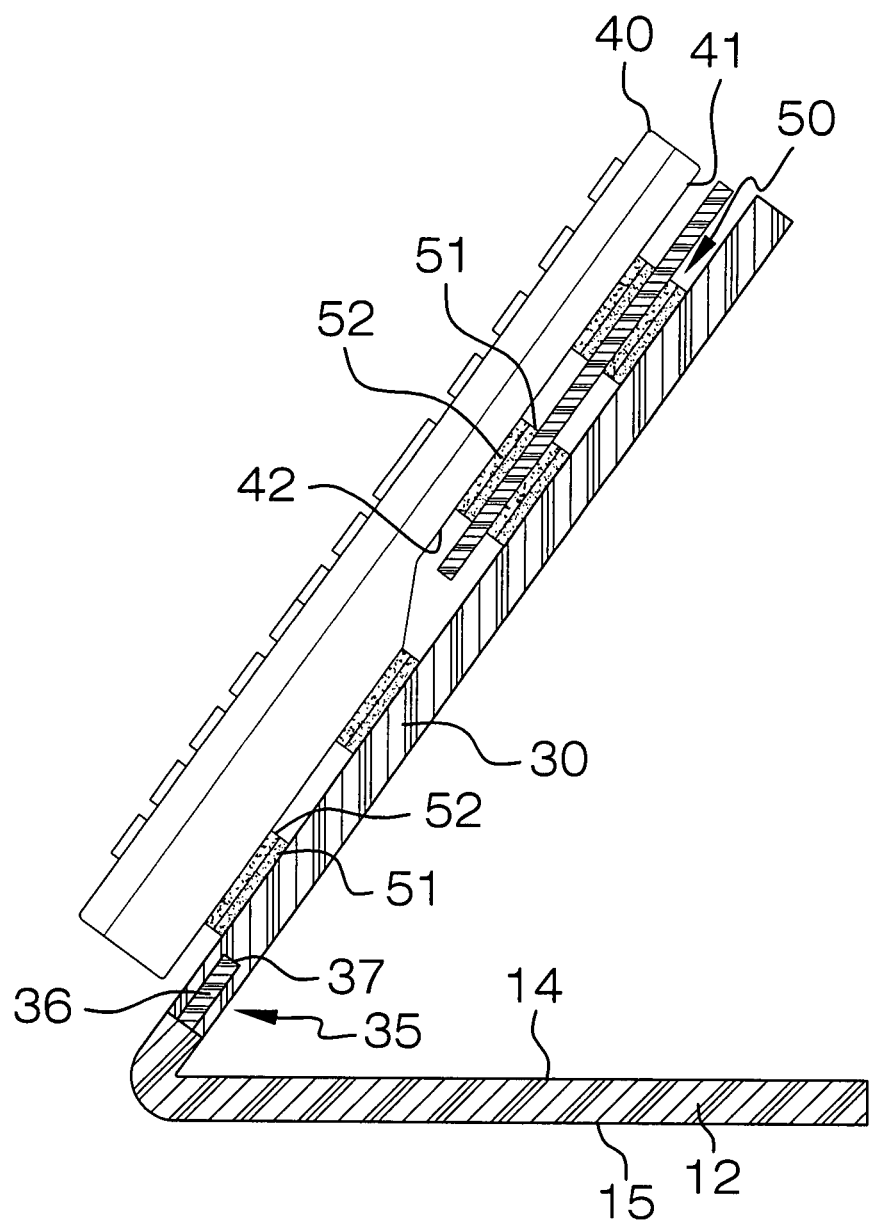
FIG. 4 is a cross-sectional view taken along line 4-4 of FIG. 3 of the present invention.
Figure 5:
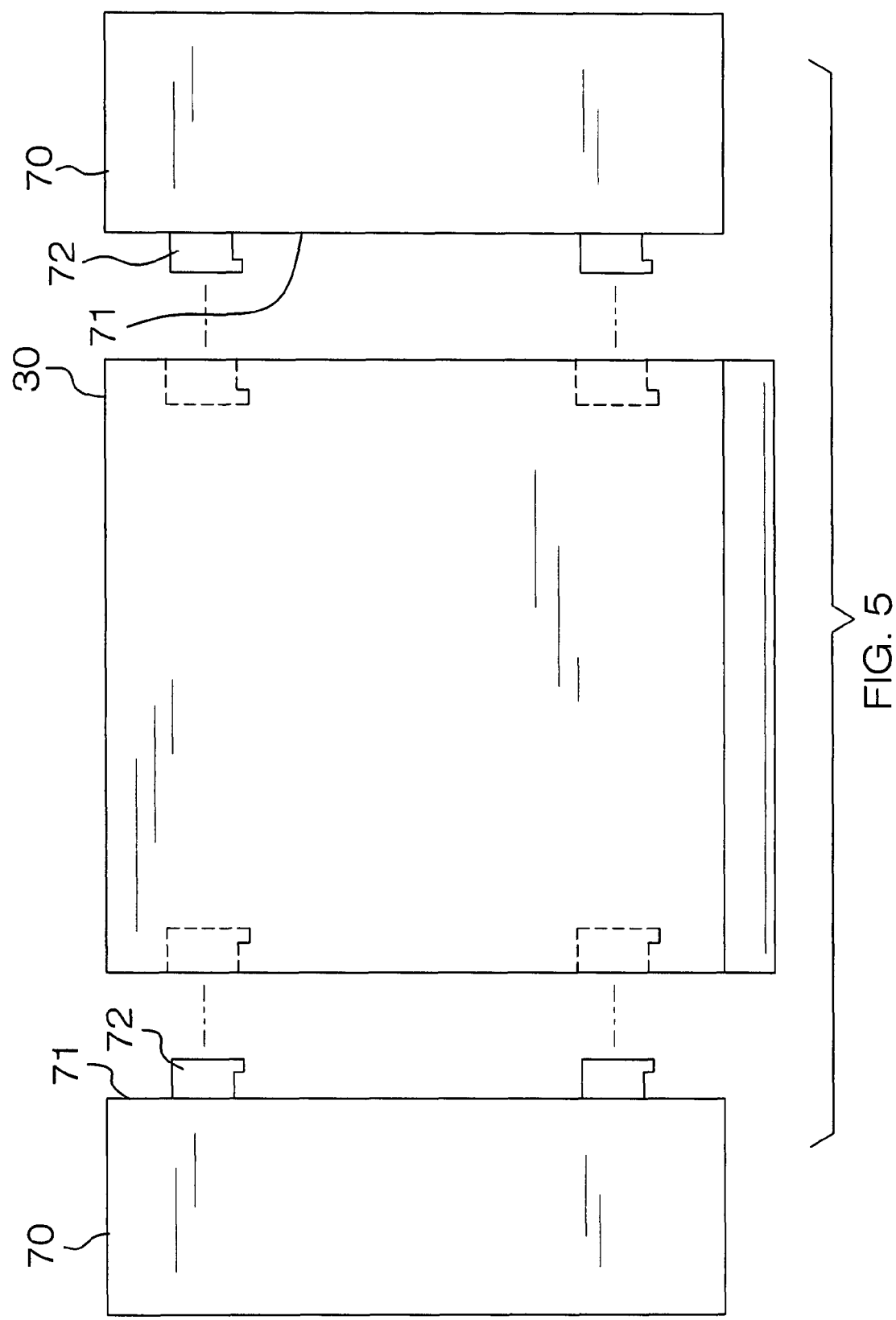
FIG. 5 is a front view of the present invention.

With reference now to the drawings, and in particular to FIGS. 1 through 5 thereof, a new remote control storage device embodying the principles and concepts of the present invention and generally designated by the reference numeral 10 will be described.

As best illustrated in FIGS. 1 through 5, the remote control organizing system 10 generally comprises a base 12 has a top side 14, a bottom side 15, a front edge 16, a rear edge 17, a first lateral edge 18 and a second lateral edge 19. A lip 20 is attached to and is coextensive with the front edge 16. The lip 20 is angled back over the top side 14. An angle between the lip 20 and the top side 14 is approximately between 35 degrees and 65 degrees. The base 12 has a width from the first lateral edge 18 to the second lateral edge 19 between 5 inches and 9 inches. The base 12 has a length from the front edge 16 to the rear edge 17 between 4 inches and 8 inches.

A panel 30 has a top edge 31, a bottom edge 32, a first side edge 33 and a second side edge 34. The panel 30 has a height from the bottom edge 32 to the top edge 31 between 9 inches and 12 inches. A coupler 35 releasably attaches the bottom edge 32 of the panel 30 to an upper edge 21 of the lip 20. The panel 30 lies in a same plane as the lip 20 and is angled back over the top side of the base. The panel 30 has a same width as the lip 20 and is coextensive with the upper edge 21. The coupler 35 includes a male mating member 36 that non-removably attached to the upper edge 21. The male mating member 36 is extendable into an aperture 37 in the bottom edge 32 of the panel 30.

A plurality of the remote controls 40 is provided. The remote controls 40 are conventional and may include any remote control for personal entertainment electronics such as televisions, DVD players, receivers and the like. Each of the remote controls 40 has a back side 41. A plurality of securing members 50 is provided to releasably attach the remote controls 40 to the panel 30. Each of the securing members 50 includes a first mating member 51 and a second mating member 52 releasably attached to each other. Each of the first mating members 51 is attached to a front side of the panel 30 and each of the back sides 41 of the remote controls 40 has at least one of the second mating members 52 attached thereto. The securing members 50 comprise hook and loop fasteners.

At least one spacer 60 is provided. The spacer 60 is approximately planer and has a height less than ½ a height of the panel 30 and a width less than ⅓ a width of the panel 30. The at least one spacer 60 is attached to the panel 30 and positioned between a raised portion 42 of one of the back sides 41 and the panel 30 to approximately position a longitudinal axis of the associated ones of the remote controls 40 into a parallel alignment with a plane of the panel 30. This eliminates the problems associated with positioning a remote control, having a contoured back side 41, onto a planar surface. The at least one spacer 60 has a first side 61 and a second side 62. The first side 61 has at least one first mating member 51 attached thereto and the second side 62 has at least one second member 52 attached thereto. A plurality of spacers 60 may be provided.

A plurality of extension plates 70 is provided. Each of the extension plates 70 has an attachment edge 71 having a plurality of connectors 72 attached thereto. Each of the connectors 72 is removably extendable into one of a plurality of slots 73 extending into first 33 and second 34 side edges of the panel 30 to releasably secure the plates 70 to the panel 30 and increase an overall width of the panel 30. The remote controls 40 may be attached to the extension plates 70 with the securing members 50 as needed.

In use, the remote controls 40 are attached to the panel 30 using the securing members 50 as shown in the Figures and described above. The spacer 60, or spacers, is used as needed to ensure that the remote control 40 is properly positioned on the panel 30 and thus is also properly secured to the panel 30 with the securing members 50.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A remote control organizing system for storing and organizing a plurality of remote controls, said system comprising:
   a base having a top side, a bottom side, a front edge, a rear edge, a first lateral edge and a second lateral edge, a lip being attached to and being coextensive with said front edge, said lip being angled back over said top side;
   a panel has a top edge, a bottom edge, a first side edge and a second side edge, said bottom edge being attached to said upper edge of said lip;
   a plurality of the remote controls each having a back side;
   a plurality of securing members releasably secure the remote controls to the panel, each of said securing members including a first mating member and a second mating member releasably attached to each other, each of said first mating members being attached to a front side of said panel, each of said back sides of said remote controls having at least one of said second mating members attached thereto;
   at least one spacer, said spacer having a height less than ½ a height of the panel and a width less than ⅓ a width of the panel, said at least one spacer being removably attached to said panel and positioned between a raised portion of one of the back sides and said panel to approximately position a longitudinal axis of the associated ones of said remote controls into a parallel alignment with a plane of said panel, said at least one spacer having a first side and a second side, each of said first and second sides being planar, said second side facing away from said panel;
   a plurality of extension plates, each of said extension plates having an attachment edge having a plurality of connectors attached thereto, each of said connectors being removably extended into one of a plurality of slots extending into said first and second side edges of said panel to releasably secure said plates to said panel and increase an overall width of said panel, wherein said remote controls are attachable to said extension plates with said securing members.

2. The system according to claim 1, wherein an angle between said lip and said top side is between 35 degrees and 65 degrees.

3. The system according to claim 1, wherein said base has a width from said first lateral edge to said second lateral edge between 5 inches and 9 inches, said base having a length from said front edge to said rear edge between 4 inches and 8 inches.

4. The system according to claim 3, wherein said panel having a height from said bottom edge to said top edge between 9 inches and 12 inches.

5. The system according to claim 1, further including a coupler attaching said bottom edge of said panel to an upper edge of said lip, said coupler includes a male mating member being non-removably attached to said upper edge, said male mating member being extendable into an aperture in said bottom edge of said panel.

6. The system according to claim 1, wherein said securing members each a comprise a hook and loop fastener.

7. The system according to claim 1, wherein said first side has at least one first mating member attached thereto to releasably engage said second mating members on said remote controls, said second side having at least one second mating member attached thereto to releasably engage said first mating members on said panel.

8. A remote control organizing system for storing and organizing a plurality of remote controls, said system comprising:
   a base having a top side, a bottom side, a front edge, a rear edge, a first lateral edge and a second lateral edge, a lip being attached to and being coextensive with said front edge, said lip being angled back over said top side, an angle between said lip and said top side being between 35 degrees and 65 degrees, said base having a width from said first lateral edge to said second lateral edge between 5 inches and 9 inches, said base having a length from said front edge to said rear edge between 4 inches and 8 inches;
   a panel has a top edge, a bottom edge, a first side edge and a second side edge, said panel having a height from said bottom edge to said top edge between 9 inches and 12 inches, said bottom edge being attached to said upper edge of said lip;
   a plurality of the remote controls each having a back side;
   a plurality of securing members releasably secure the remote controls to the panel, each of said securing members including a first mating member and a second mating member releasably attached to each other, each of said first mating members being attached to a front side of said panel, each of said back sides of said remote controls having at least one of said second mating members attached thereto, said securing members comprising hook and loop fasteners;
   at least one spacer, said spacer being approximately planer and having a height less than ½ a height of the panel and a width less than ⅓ a width of the panel, said at least one spacer being attached to said panel and positioned between a raised portion of one of the back sides and said panel to approximately position a longitudinal axis of the associated ones of said remote controls into a parallel alignment with a plane of said panel, said at least one spacer having a first side and a second side, said first side having at least one first mating member attached thereto to releasably engage said second mating members on said remote controls, said second side having at least one second mating member attached thereto to releasably engage said first mating members on said panel, each of said first and second sides being planar; and a plurality of extension plates, each of said extension plates having an attachment edge having a plurality of connectors attached thereto, each of said connectors being removably extended into one of a plurality of slots extending into said first and second side edges of said panel to releasably secure said plates to said panel and increase an overall width of said panel, wherein said remote controls are attachable to said extension plates with said securing members.

9. The system according to claim 1, wherein each of said remote controls has a forward side positioned opposite of associated ones of said back sides, a thickness being defined between associated ones of said forward and back sides, at least one of said remote controls having a varying thickness wherein said raised portion is defined by an area of decreased thickness adjacent to an area of relative increased thickness.

10. A remote control organizing system for storing and organizing a plurality of remote controls, said system comprising:
a base having a top side, a bottom side, a front edge, a rear edge, a first lateral edge and a second lateral edge, a lip being attached to and being coextensive with said front edge, said lip being angled back over said top side;
a panel has a top edge, a bottom edge, a first side edge and a second side edge, said bottom edge being attached to said lip;
a plurality of securing members configured to releasably secure the remote controls to the panel, each of said securing members including a first mating member and a second mating member releasably attached to each other, each of said first mating members being attached to a front side of said panel, said second mating members being configured to be attachable to back sides of the remote controls;
at least one spacer, said spacer being approximately planer and having a height less than ½ a height of the panel and a width less than ⅓ a width of the panel, said at least one spacer being attached to said panel and configured to be positioned between a non-planar one of the back sides of the remotes to approximately position a longitudinal axis of the associated one of said remote controls into a parallel alignment with a plane of said panel, said at least one spacer having a first side and a second side, each of said first and second sides being planar, said second side facing away from said panel and a plurality of extension plates, each of said extension plates having an attachment edge having a plurality of connectors attached thereto, each of said connectors being removably extended into one of a plurality of slots extending into said first and second side edges of said panel to releasably secure said plates to said panel and increase an overall width of said panel.

11. The system according to claim 10, wherein an angle between said lip and said top side is between 35 degrees and 65 degrees.

12. The system according to claim 10, wherein said base has a width from said first lateral edge to said second lateral edge between 5 inches and 9 inches, said base having a length from said front edge to said rear edge between 4 inches and 8 inches.

13. The system according to claim 12, wherein said panel having a height from said bottom edge to said top edge between 9 inches and 12 inches.

14. The system according to claim 10, further including a coupler attaching said bottom edge of said panel to an upper edge of said lip, said coupler includes a male mating member being non-removably attached to said upper edge, said male mating member being extendable into an aperture in said bottom edge of said panel.

15. The system according to claim 10, wherein said securing members each comprise a hook and loop fastener.

16. The system according to claim 10, wherein said first side has at least one first mating member attached thereto configured to releasably engage said second mating members on the remote controls, said second side having at least one second mating member attached thereto to releasably engage said first mating members on said panel.

* * * * *